US011231109B2

(12) United States Patent
Oyama et al.

(10) Patent No.: US 11,231,109 B2
(45) Date of Patent: Jan. 25, 2022

(54) METHOD FOR MANUFACTURING SEALING DEVICE, AND SEALING DEVICE

(71) Applicant: NOK CORPORATION, Tokyo (JP)

(72) Inventors: Takayuki Oyama, Fukushima (JP); Tatsuya Mori, Fukushima (JP); Hiroshi Onodera, Fukushima (JP)

(73) Assignee: NOK CORPORATION, Tokyo (JP)

( * ) Notice: Subject to any disclaimer, the term of this patent is extended or adjusted under 35 U.S.C. 154(b) by 64 days.

(21) Appl. No.: 16/480,212

(22) PCT Filed: May 16, 2018

(86) PCT No.: PCT/JP2018/018868
§ 371 (c)(1),
(2) Date: Jul. 23, 2019

(87) PCT Pub. No.: WO2018/212218
PCT Pub. Date: Nov. 22, 2018

(65) Prior Publication Data

US 2020/0080642 A1    Mar. 12, 2020

(30) Foreign Application Priority Data

May 18, 2017 (JP) .............................. JP2017-098729

(51) Int. Cl.
*F16J 15/16* (2006.01)
*F16J 15/3232* (2016.01)
(Continued)

(52) U.S. Cl.
CPC .......... *F16J 15/164* (2013.01); *F16J 15/3232* (2013.01); *F16F 2230/30* (2013.01);
(Continued)

(58) Field of Classification Search
CPC .......... F16J 15/16; F16J 15/164; F16J 15/166; F16J 15/50; F16J 15/52; F16J 15/30;
(Continued)

(56) References Cited

U.S. PATENT DOCUMENTS 4,300,778 A * 11/1981 Gagne ................... F16J 15/166
277/568
4,427,206 A * 1/1984 Sugiyama ............ F16J 15/3216
277/568

(Continued)

FOREIGN PATENT DOCUMENTS

| CN | 101324272 A | 12/2008 |
| CN | 202001614 U | 10/2011 |

(Continued)

OTHER PUBLICATIONS

Extended Search Report for European Application No. 18801892.3 dated Feb. 1, 2021.

(Continued)

*Primary Examiner* — Nathan Cumar
(74) *Attorney, Agent, or Firm* — Pearne & Gordon LLP

(57) ABSTRACT

[Problem] To provide a method for manufacturing a sealing device having high pressure-resistance and high durability. Provided is a method for manufacturing a sealing device to be provided between a shaft and an inner surface of a shaft hole in which the shaft is provided, the method comprising: a step for forming an atmosphere-side rigid ring by forming a through-hole in a rigid body by a punching-out process; a step for causing a reinforcement ring for reinforcing an elastic ring to contact the elastic ring in a direction parallel to the axial direction of the shaft, wherein the elastic ring is made of an elastic body, is attached to a liquid-side rigid ring made of a rigid body and disposed inside the shaft hole, is disposed radially inward of the liquid-side rigid ring, and has formed thereon a seal lip that slidably makes sealing contact (Continued)

with the shaft; and a step for causing the atmosphere-side rigid ring to contact the reinforcement ring in a direction parallel to the axial direction of the shaft so that a surface contacted by an end surface of a punch during the punching-out process of the atmosphere-side rigid ring is positioned on an opposite side to the reinforcement ring.

8 Claims, 9 Drawing Sheets

(51) Int. Cl.
    *F16J 15/322*     (2016.01)
    *F16J 15/3252*     (2016.01)
    *F16J 15/34*     (2006.01)

(52) U.S. Cl.
    CPC .......... *F16J 15/322* (2013.01); *F16J 15/3252* (2013.01); *F16J 15/3456* (2013.01)

(58) Field of Classification Search
    CPC .. F16J 15/3204; F16J 15/3208; F16J 15/3212; F16J 15/3216; F16J 15/322; F16J 15/3232; F16J 15/3248; F16J 15/3252; F16J 15/34; F16J 15/3436; F16J 15/3456; F16F 2230/30
    USPC ........................................................ 277/552
    See application file for complete search history.

(56) References Cited

U.S. PATENT DOCUMENTS

| | | | | |
|---|---|---|---|---|
| 5,456,475 | A | * 10/1995 | Abraham | B01D 33/801 210/171 |
| 6,322,082 | B1 | * 11/2001 | Paykin | F16J 15/322 277/549 |
| 2002/0014747 | A1 | * 2/2002 | Yamada | F16J 15/3228 277/619 |
| 2007/0052180 | A1 | * 3/2007 | Watanabe | F16J 15/322 277/551 |
| 2008/0309016 | A1 | * 12/2008 | Ozawa | F16J 15/322 277/345 |
| 2012/0199431 | A1 | * 8/2012 | Pasino | F16F 9/362 188/322.17 |

FOREIGN PATENT DOCUMENTS

| | | |
|---|---|---|
| EP | 2418393 A1 | 2/2012 |
| JP | 2005-090569 A | 4/2005 |
| JP | 4332703 B2 | 9/2009 |

OTHER PUBLICATIONS

Search Report and translation for International Application No. PCT/JP2018/018868 dated Jun. 19, 2018.

* cited by examiner

[Figure 1]
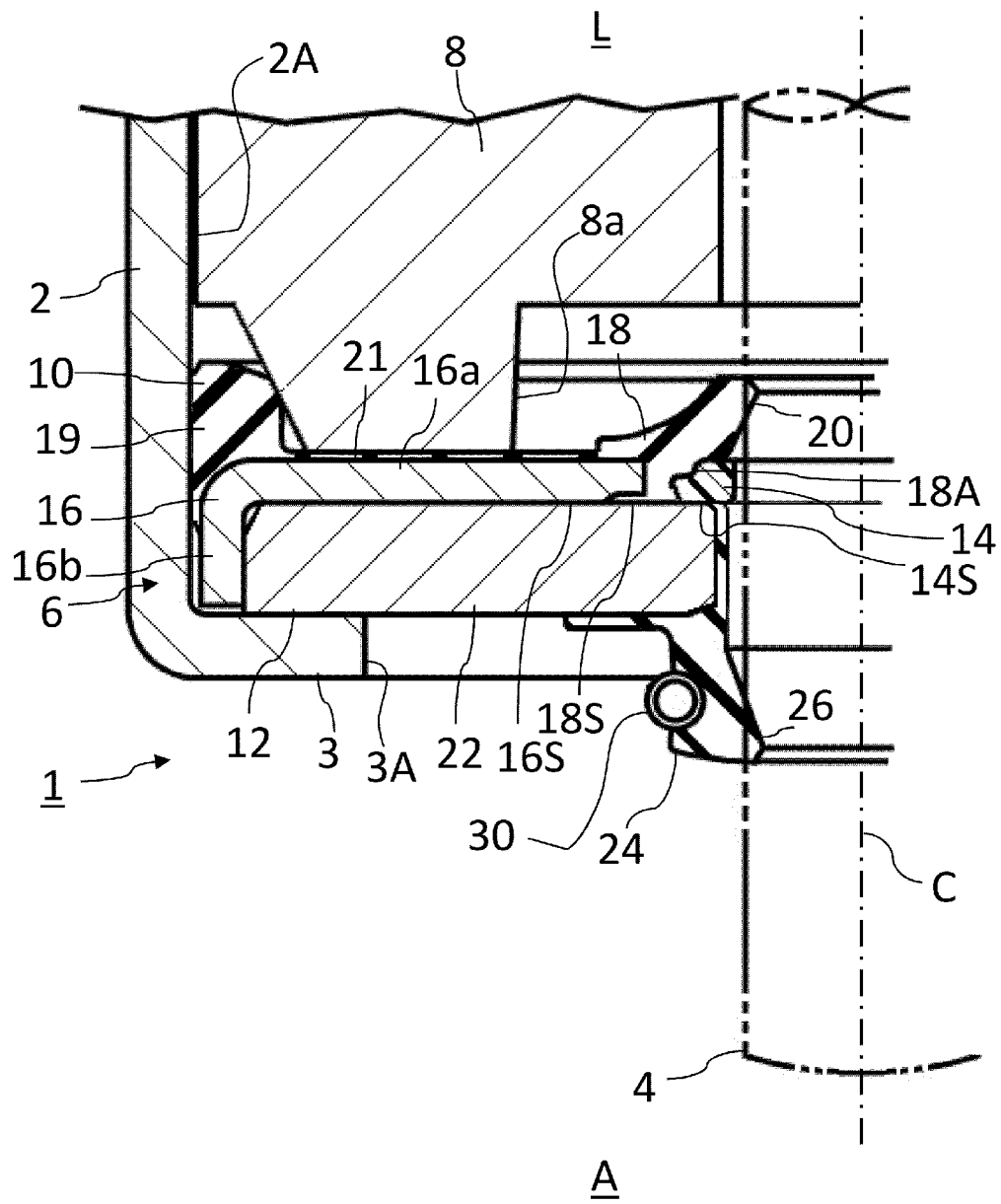

[Figure 2]
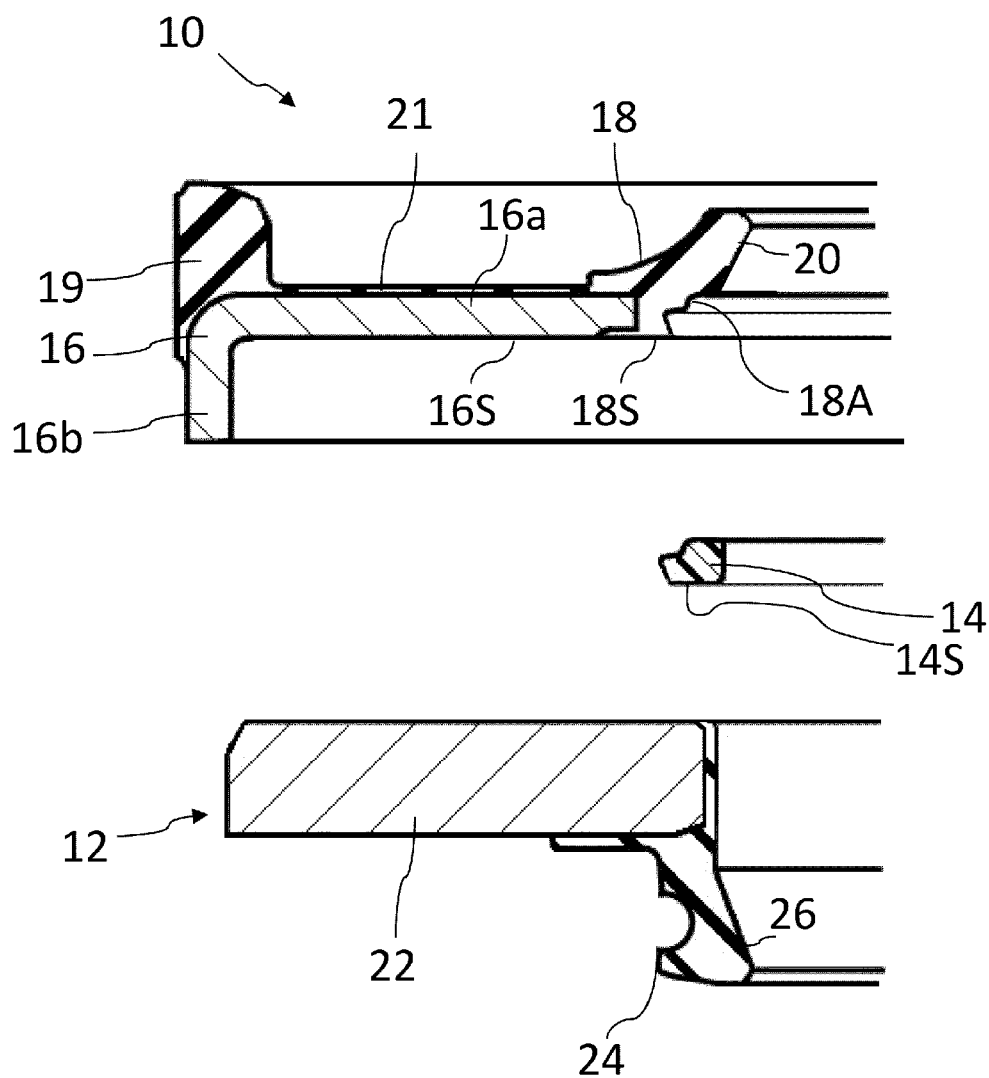

[Figure 3]
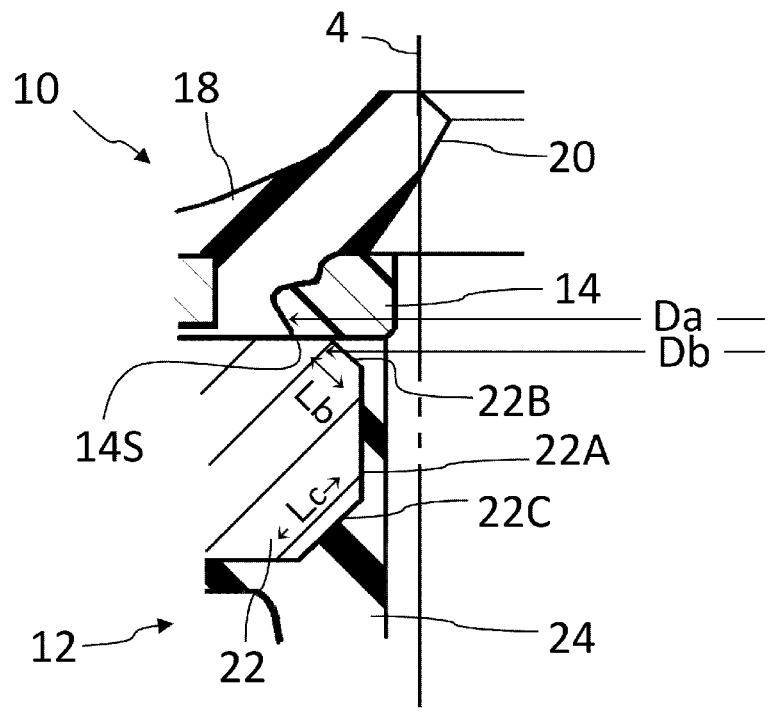
[Figure 4]
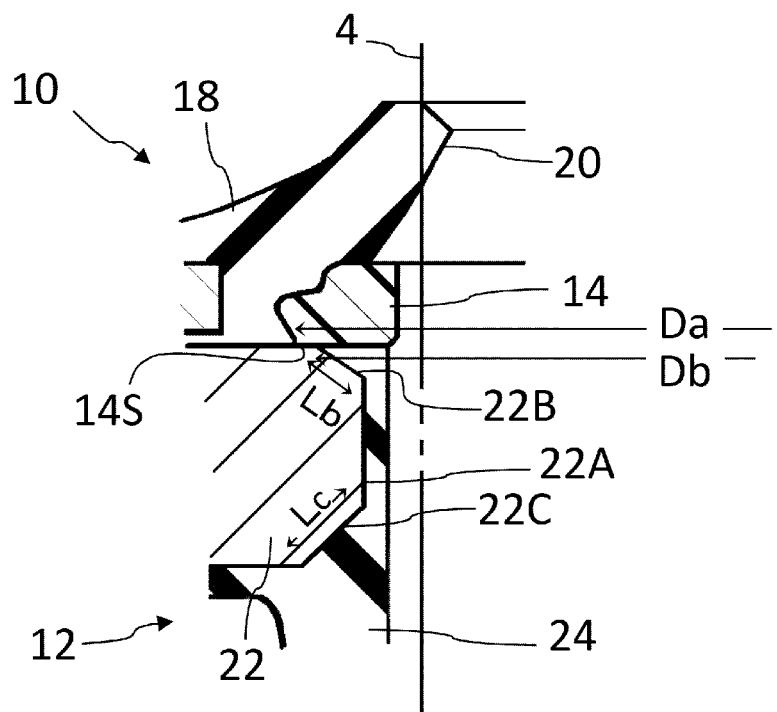

[Figure 5]
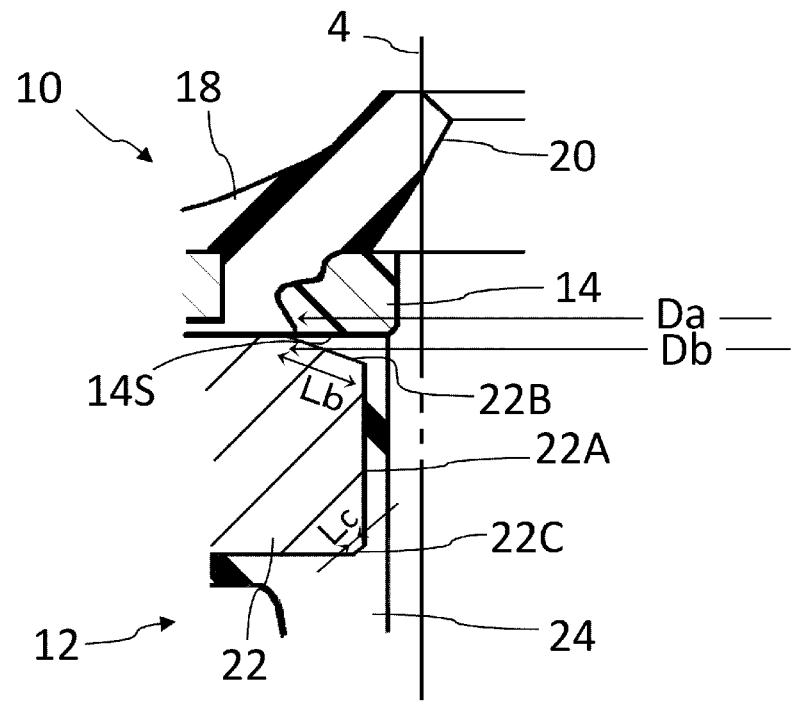
[Figure 6]
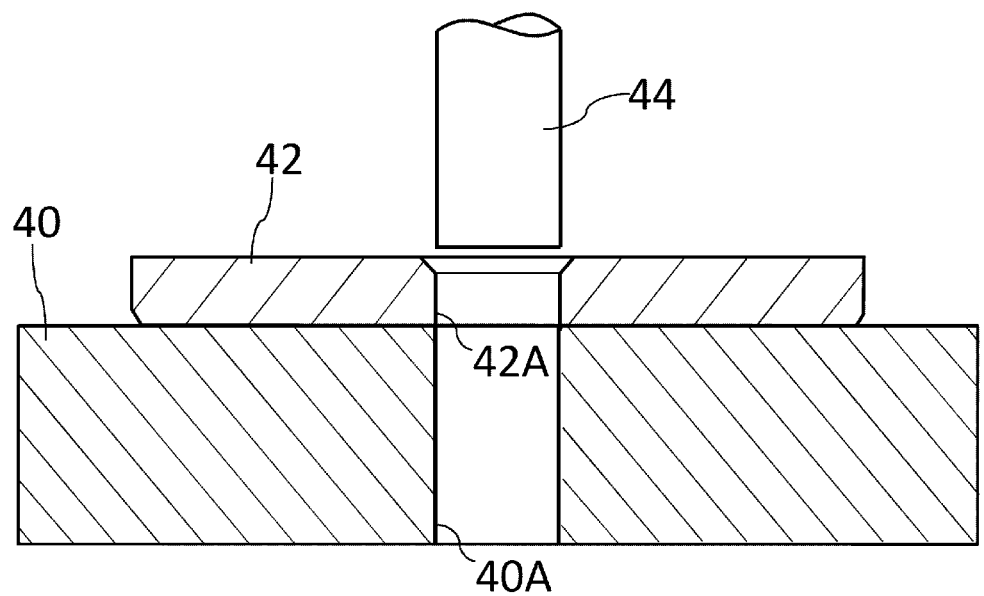

[Figure 7]
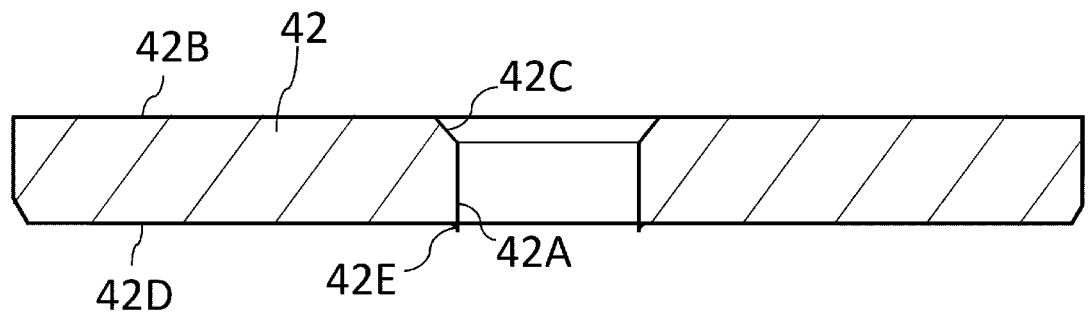
[Figure 8]
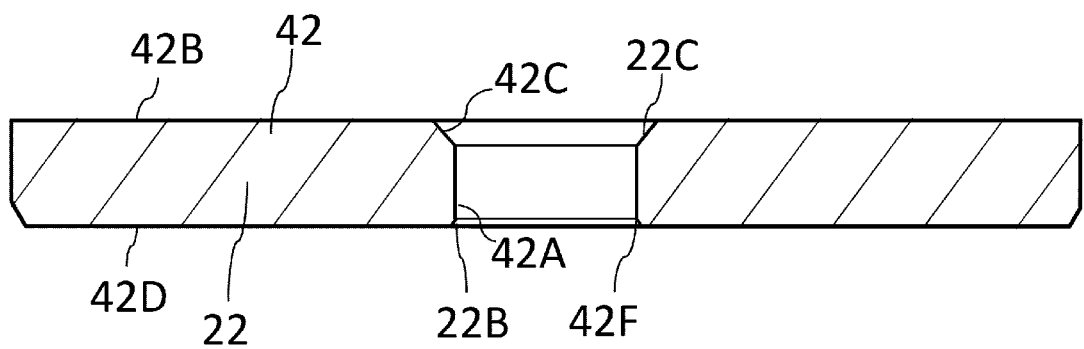
[Figure 9]
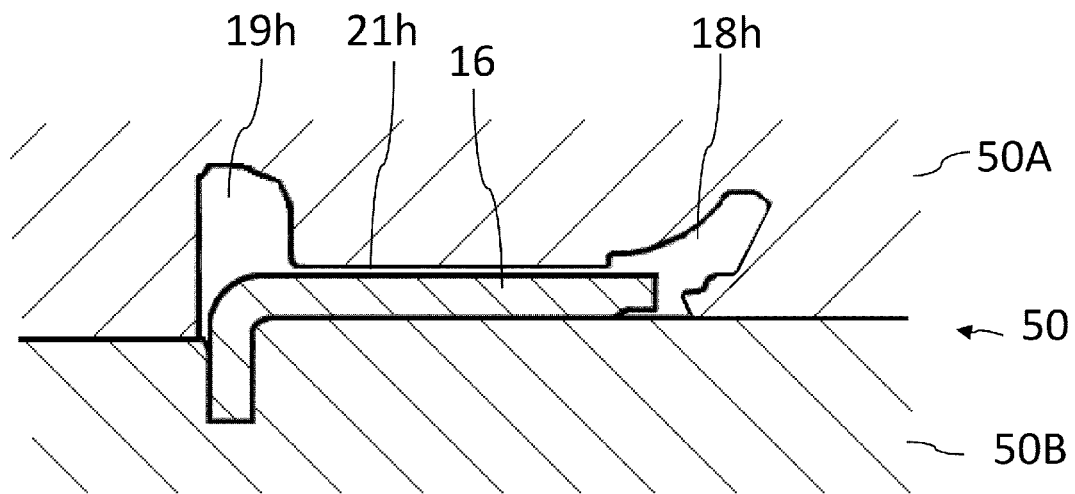

[Figure 10]
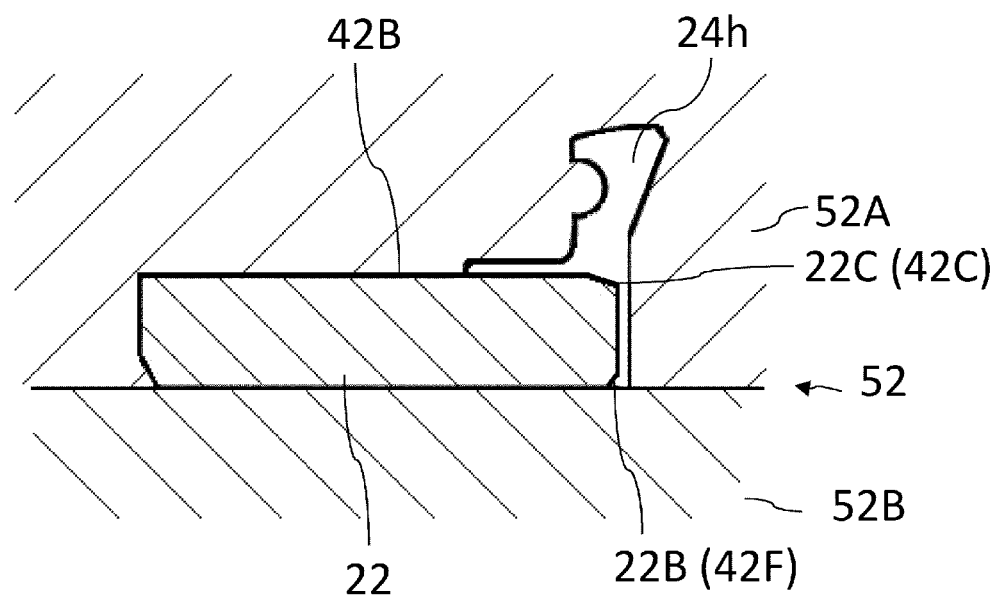
[Figure 11]
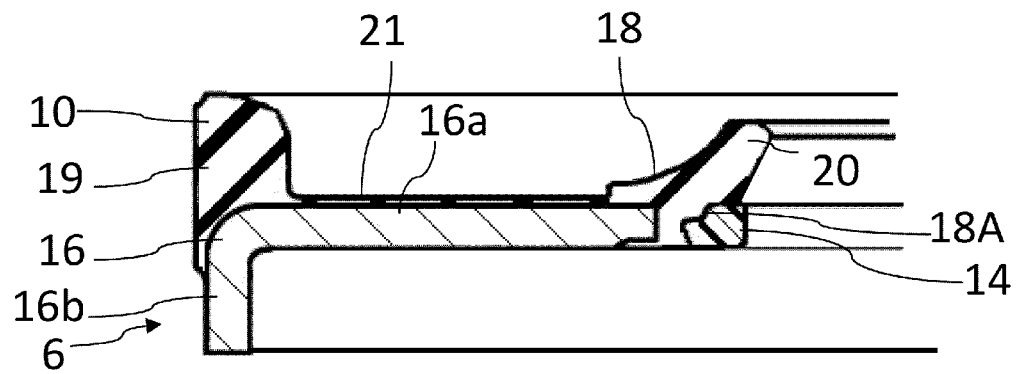

[Figure 12]
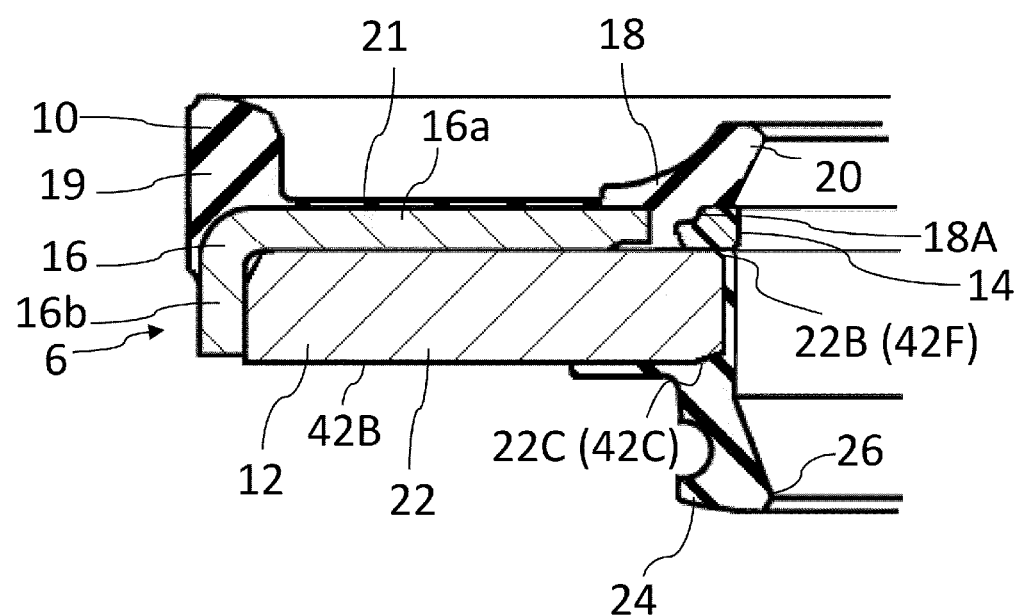

[Figure 13]
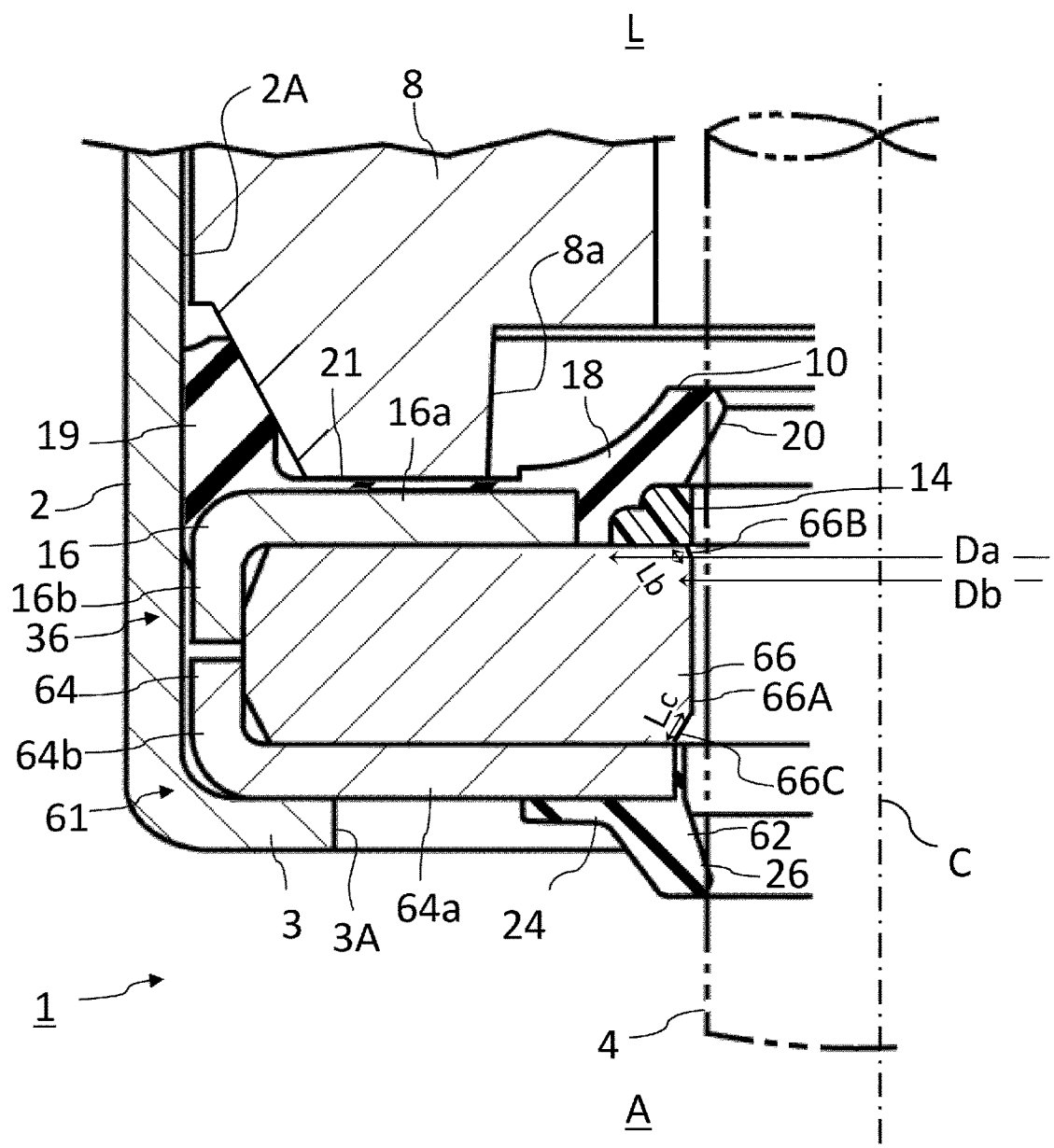

[Figure 14]
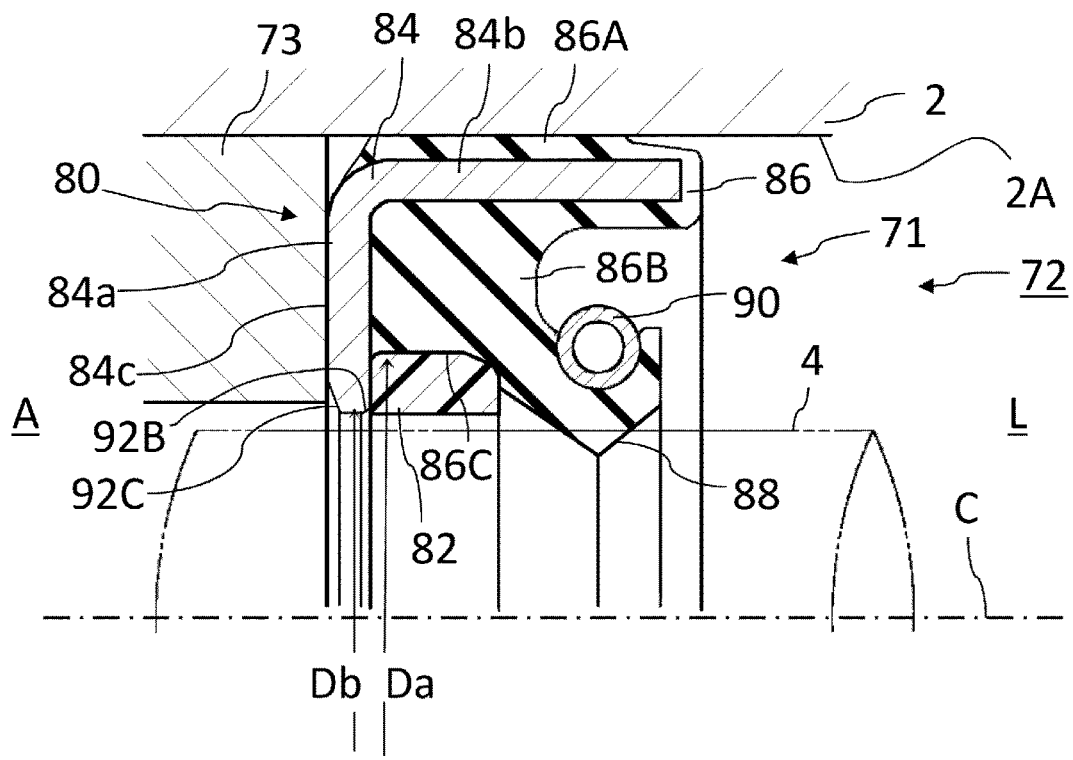
[Figure 15]
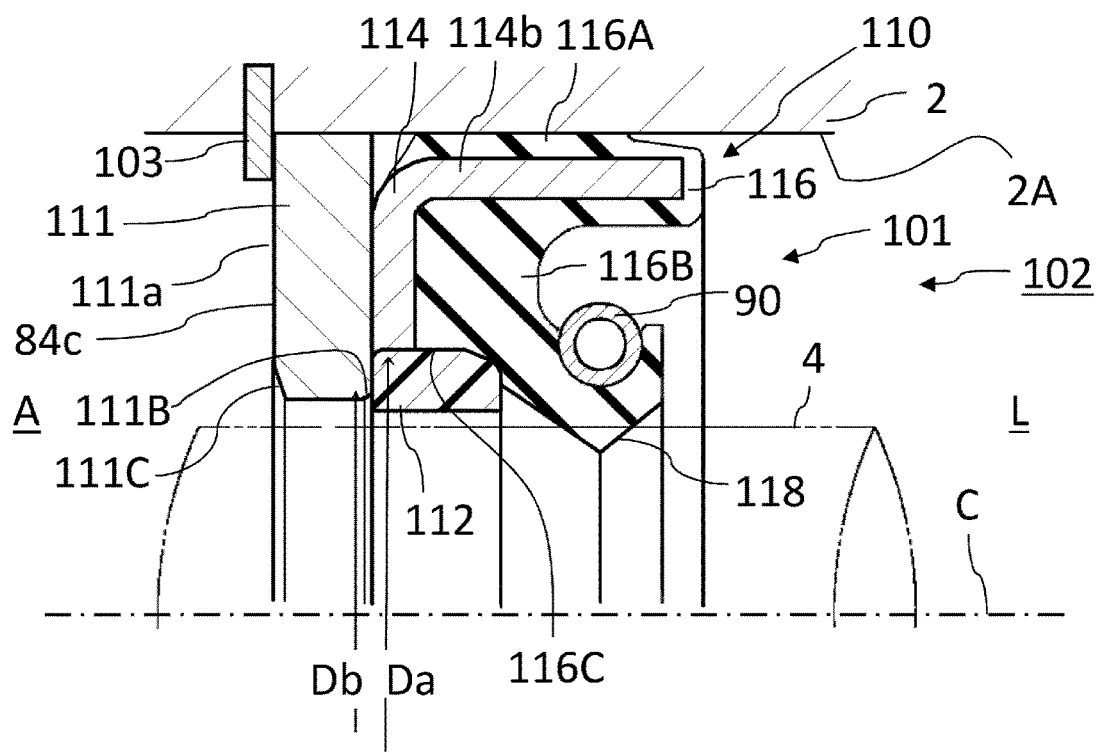

METHOD FOR MANUFACTURING SEALING DEVICE, AND SEALING DEVICE

TECHNICAL FIELD

The present invention pertains to: a method for manufacturing a sealing device to be used for sealing the area around a shaft of an apparatus having a shaft; and a sealing device.

BACKGROUND ART

Patent document 1 discloses a sealing device for a shock absorber of a vehicle suspension device. This sealing device has: a metal reinforcement ring; a main lip disposed on an inner peripheral portion of the reinforcement ring and provided on an oil chamber side; and a dust lip disposed on the inner peripheral portion of the reinforcement ring and provided on an outer space side. The main lip and the dust lip are formed from an elastic material such as fluororubber and are adhered to the reinforcement ring. More precisely, an elastic body part comprising the main lip and an elastic body part comprising the dust lip are adhered, respectively, to the two surfaces of the reinforcement ring. Further, a thin elastic body part for coupling these elastic body parts is adhered to the inner periphery surface of the reinforcement ring.

Patent document 2 discloses a sealing device for a shock absorber, said sealing device having provided therein a back-up ring for reinforcing the main lip.

PRIOR ART DOCUMENTS

Patent Documents

Patent Document 1: Japanese Patent No. 4332703
Patent Document 2: JP 2005-090569

SUMMARY OF INVENTION

Technical Problem

Accompanying the greater variation in vehicle driving environments and ways of being driven, the usage conditions of sealing devices for shock absorbers have become harsher. Further, when internal oil pressure is high such as in a monotube-type shock absorber, designing requires consideration of the pressure resistance and the durability of the sealing device. Moreover, it is desirable that a sealing device for a rotary shaft also has high pressure resistance and high durability.

Here, the objective of the present invention is to provide a method for manufacturing a sealing device having high pressure resistance and high durability, and a sealing device.

Solution to Problem

The method for manufacturing a sealing device according to the present invention is a method for manufacturing a sealing device provided between a shaft and an inner surface of a shaft hole in which the shaft is provided, the method comprising: a step for forming an atmosphere-side rigid ring by forming a through-hole in a rigid body by a punching-out process; a step for causing a reinforcement ring for reinforcing an elastic ring to contact the elastic ring in a direction parallel to the axial direction of the shaft, wherein the elastic ring is made of an elastic body, is attached to a liquid-side rigid ring made of a rigid body and provided inside the shaft hole, is provided radially inward of the liquid-side rigid ring and has formed thereon a seal lip that slidably makes sealing contact with the shaft; and a step for causing the atmosphere-side rigid ring to contact the reinforcement ring in a direction parallel to the axial direction of the shaft so that a surface contacted by an end surface of a punch during the punching-out process of the atmosphere-side rigid ring is positioned on an opposite side to the reinforcement ring.

According to this method, by causing the atmosphere-side rigid ring to contact the reinforcement ring in a direction parallel to the axial direction of the shaft so that the surface contacted by the end surface of the punch during the punching-out process of the atmosphere-side rigid ring is positioned on the opposite side to the reinforcement ring, it is possible to realize a configuration wherein the length of an inclined surface of a corner portion on the reinforcement ring side in an inner peripheral surface of the atmosphere-side rigid ring is smaller than the length of an inclined surface of a corner portion on an opposite side to the reinforcement ring in the inner peripheral surface of the atmosphere-side rigid ring. Due thereto, a contact surface area of the reinforcement ring with respect to the atmosphere-side rigid ring becomes larger and the reinforcement ring is strongly reinforced by the atmosphere-side rigid ring. Accordingly, it is possible to enhance the pressure resistance and the durability of the sealing device.

The step for causing the reinforcement ring to contact the elastic ring may be performed either before or after the step for causing the atmosphere-side rigid ring to contact the reinforcement ring, and the two steps may also be performed simultaneously.

A sealing device according to one embodiment of the present invention is a sealing device provided between a shaft and an inner surface of a shaft hole in which the shaft is provided, the sealing device comprising: a liquid-side rigid ring made of a rigid body and provided inside the shaft hole; an elastic ring which is made of an elastic body, is attached to the liquid-side rigid ring, is provided radially inward of the liquid-side rigid ring and has formed thereon a seal lip that slidably makes sealing contact with the shaft; a reinforcement ring which contacts the elastic ring in a direction parallel to the axial direction of the shaft and reinforces the elastic ring; and an atmosphere-side rigid ring which is made of a rigid body, contacts the reinforcement ring in a direction parallel to the axial direction of the shaft, and reinforces the reinforcement ring, wherein the maximum diameter of an inclined surface of a corner portion on the reinforcement ring side in an inner peripheral surface of the atmosphere-side rigid ring is smaller than the diameter of the reinforcement ring on the atmosphere-side rigid ring side.

According to this configuration, the maximum diameter of the inclined surface of the corner portion on the reinforcement ring side in the inner peripheral surface of the atmosphere-side rigid ring is smaller than the diameter of the reinforcement ring on the atmosphere-side rigid ring side, and therefore at least one portion of the reinforcement ring definitely contacts the atmosphere-side rigid ring and is reinforced by the atmosphere-side rigid ring. Accordingly, it is possible to enhance the pressure resistance and the durability of the sealing device.

A sealing device according to another embodiment of the present invention is a sealing device provided between a shaft and an inner surface of a shaft hole in which the shaft is provided, the sealing device comprising: a liquid-side rigid ring made of a rigid body and provided inside the shaft hole; an elastic ring which is made of an elastic body, is attached to the liquid-side rigid ring, is provided radially inward of the liquid-side rigid ring and has formed thereon a seal lip that slidably makes sealing contact with the shaft; a reinforcement ring which contacts the elastic ring in a direction parallel to the axial direction of the shaft and reinforces the elastic ring; and an atmosphere-side rigid ring which is made of a rigid body, contacts the reinforcement ring in a direction parallel to the axial direction of the shaft, and reinforces the reinforcement ring, wherein the length of an inclined surface of a corner portion on the reinforcement ring side in an inner peripheral surface of the atmosphere-side rigid ring is smaller than the length of an inclined surface of a corner portion on an opposite side to the reinforcement ring in the inner peripheral surface of the atmosphere-side rigid ring.

According to this configuration, the length of the inclined surface of the corner portion on the reinforcement ring side in the inner peripheral surface of the atmosphere-side rigid ring is smaller than the length of the inclined surface of the corner portion on the opposite side to the reinforcement ring in the inner peripheral surface of the atmosphere-side rigid ring, and therefore the contact surface area of the reinforcement ring with respect to the atmosphere-side rigid ring is larger and the reinforcement ring is strongly reinforced by the atmosphere-side rigid ring. Accordingly, it is possible to enhance the pressure resistance and the durability of the sealing device.

The liquid-side rigid ring and the elastic ring may be joined to one another and constitute one oil seal member.

The liquid-side rigid ring and the atmosphere-side rigid may be formed integrally, and further may be joined to the elastic ring and constitute one oil seal member.

BRIEF DESCRIPTION OF DRAWINGS

FIG. 1 is a cross-sectional view of a sealing device according to a first embodiment of the present invention.

FIG. 2 is an exploded cross-sectional view of the sealing device of FIG. 1.

FIG. 3 is an enlarged cross-sectional view of a portion of the sealing device of FIG. 1.

FIG. 4 is an enlarged cross-sectional view of a portion of another suitable sealing device.

FIG. 5 is an enlarged cross-sectional view of a portion of a non-suitable sealing device.

FIG. 6 shows a step for producing an atmosphere-side rigid ring of the sealing device of FIG. 1.

FIG. 7 is a cross-sectional view of the atmosphere-side rigid ring after the production step of FIG. 6.

FIG. 8 is a cross-sectional view of the atmosphere-side rigid ring processed after FIG. 7.

FIG. 9 is a schematic view showing an example of a step for producing an oil seal member of the sealing device of FIG. 1.

FIG. 10 is a schematic view showing an example of a step for producing a dust seal member of the sealing device of FIG. 1.

FIG. 11 shows an example of a manufacturing step of the sealing device of FIG. 1.

FIG. 12 shows an example of a manufacturing step of the sealing device of FIG. 1.

FIG. 13 is a cross-sectional view of a sealing device according to a second embodiment of the present invention.

FIG. 14 is a cross-sectional view of a sealing device according to a third embodiment of the present invention.

FIG. 15 is a cross-sectional view of a sealing device according to a fourth embodiment of the present invention.

DESCRIPTION OF EMBODIMENTS

Below, various embodiments of the present invention are described with reference to the attached drawings.

First Embodiment

FIG. 1 shows the first embodiment of the present invention, and shows a portion of a shock absorber, which is an apparatus that has a reciprocating shaft, and a sealing device disposed in the shock absorber.

A shock absorber 1 comprises a cylindrical housing 2 and a columnar reciprocating shaft 4. The housing 2 is cylindrical and comprises a shaft hole 2A having the reciprocating shaft 4 provided therein. Oil, that is, a liquid L, has been put into the shaft hole 2A. An end wall 3 having an opening 3A formed in the center thereof is formed at the lower end of the housing 2.

A sealing device 6, which is an oil seal, and a rod guide 8 are provided inside the housing 2. Although the details are not shown, the rod guide 8 is fixed to the housing 2. The rod guide 8 guides the reciprocating action of the reciprocating shaft 4 in the vertical direction in FIG. 1 (that is, the axial direction of the reciprocating shaft 4) and presses the sealing device 6 to the end wall 3.

The sealing device 6 is provided inside the housing 2, and the movement of the sealing device 6 in the lateral direction in FIG. 1 is restricted by the inner peripheral surface of the housing 2. Further, the sealing device 6 is sandwiched by the rod guide 8 and the end wall 3, and the movement of the sealing device 6 along the axial direction of the reciprocating shaft 4 is restricted. The sealing device 6 is provided between the reciprocating shaft 4 and the inner surface of the shaft hole 2A in which the reciprocating shaft 4 is provided, and prevents or reduces leakage of the liquid L from a liquid L side to an atmosphere A side.

The reciprocating shaft 4 is columnar, the shaft hole 2A is cross-sectionally circular, and the sealing device 6 is substantially annular, but FIG. 1 shows only the left half of these parts. FIG. 1 shows a central axis C which is common to the reciprocating shaft 4, the shaft hole 2A, and the sealing device 6.

In this embodiment, the sealing device 6 comprises three separate members, i.e., an oil seal member 10, a dust seal member 12, and a back-up ring (reinforcement ring) 14. If necessary, see FIG. 2 which is an exploded cross-sectional view clearly showing these three members.

The oil seal member 10 comprises: a liquid-side rigid ring 16 provided inside the shaft hole 2A and attached to the shaft hole 2A; and a liquid-side elastic ring 18 fixed to the liquid-side rigid ring 16. In other words, the liquid-side rigid ring 16 and the liquid-side elastic ring 18 are joined to one another and constitute one oil seal member 10. The liquid-side rigid ring 16 is formed from a rigid body such as a metal. The liquid-side rigid ring 16 has an L-shaped cross-section and comprises an annular portion 16a and a cylindrical portion 16b extending from an outer edge of the annular portion 16a.

The liquid-side elastic ring 18 is formed from an elastic material such as an elastomer and is fixed to the inner peripheral edge of the annular portion 16a of the liquid-side rigid ring 16. The liquid-side elastic ring 18 has formed thereon an oil lip (seal lip) 20 provided radially inward of the liquid-side rigid ring 16. The oil lip 20 makes sealing contact with the outer peripheral surface of the reciprocating shaft 4 and prevents or reduces leakage of a liquid from the liquid L side to the atmosphere A side. When the reciprocating shaft 4 moves in the direction of the central axis C, the reciprocating shaft 4 slides with respect to the oil lip 20.

Moreover, the oil seal member 10 comprises an outer gasket 19. The outer gasket 19 is formed from an elastic material such as an elastomer and is fixed in close adherence with the annular portion 16a and the cylindrical portion 16b of the liquid-side rigid ring 16. The liquid-side rigid ring 16 applies a supporting force on the outer gasket 19 radially outwardly, that is, toward the inner peripheral surface of the shaft hole 2A, and the outer gasket 19 is compressed by the inner peripheral surface of the shaft hole 2A and the liquid-side rigid ring 16. Thus, the outer gasket 19 prevents or reduces leakage of a liquid through an outer portion of the shaft hole 2A from the liquid L side to the atmosphere A side.

Although the outer gasket 19 and the liquid-side elastic ring 18 may be separate, in this embodiment, they are coupled via a thin film portion 21. That is, the liquid-side elastic ring 18, the outer gasket 19, and the thin film portion 21 constitute a continuous integrated elastic portion formed from the same material. The thin film portion 21 is also fixed in close adherence with the liquid-side rigid ring 16. In this embodiment, a protrusion 8a of the guide rod 8 is caused to contact the thin film portion 21 of the oil seal member 10 and a pressing force is applied to the sealing device 6 toward the end wall 3 of the housing 2.

The dust seal member 12 comprises: an atmosphere-side rigid ring 22 provided inside the shaft hole 2A and attached to the shaft hole 2A; and an atmosphere-side elastic ring 24 fixed to the atmosphere-side rigid ring 22. The atmosphere-side rigid ring 22 is a circular ring formed from a rigid body such as a metal.

The atmosphere-side elastic ring 24 is formed from an elastic material such as an elastomer and is fixed to the inner peripheral edge of the atmosphere-side rigid ring 22. The atmosphere-side elastic ring 24 has formed thereon a dust lip 26 provided radially inward of the atmosphere-side rigid ring 22. The dust lip 26 contacts the outer peripheral surface of the reciprocating shaft 4 and predominantly fulfills a role of preventing foreign matter (for example, mud, water, dust) from entering from the atmosphere A side to the liquid L side. When the reciprocating shaft 4 moves in the direction of the central axis C, the reciprocating shaft 4 slides with respect to the dust lip 26. The dust lip 26 may make sealing contact with the outer peripheral surface of the reciprocating shaft 4 so as to fulfill a role of preventing or reducing leakage of a liquid.

This sealing device 6 comprises a garter spring 30 wound around the atmosphere-side elastic ring 24. The garter spring 30 applies a force on the dust lip 26 for pressing the dust lip 26 to the reciprocating shaft 4. However, the garter ring 30 is not essential. Further, a garter spring may be wound around the liquid-side elastic ring 18 in order to press the oil lip 20 to the reciprocating shaft 4.

In order to contact the outer peripheral surface of the reciprocating shaft 4, the oil lip 20 and the dust lip 26 are caused to elastically deform radially outwardly more than the state shown in FIG. 1. FIG. 1 shows a state in which a sealing device 1 is not provided around the reciprocating shaft 4 (the reciprocating shaft 4 is shown by a dotted line) and does not show deformation of these lips 20, 26.

A concave portion 18A is formed radially inward of the liquid-side elastic ring 18 of the oil seal member 10. The concave portion 18A is open on the liquid L side.

The concave portion 18A has detachably fitted therein a back-up ring (reinforcement ring) 14 formed from a rigid body such as a resin (for example, polytetrafluoroethylene) or a metal. As shown in FIG. 1, at least one groove is formed in the concave portion 18A, and a protrusion to be press-fitted in the groove may be formed on the back-up ring 14. A through-hole into which the reciprocating shaft 4 is inserted is formed in the center of the back-up ring 14. The back-up ring 14 is fitted in the concave portion 18A and therefore contacts the liquid-side elastic ring 18 in a direction parallel to the axial direction of the reciprocating shaft 4, and thus in axial alignment with the reciprocating shaft 4, and reinforces the liquid-side elastic ring 18. Due to the back-up ring 14, it is possible to enhance the pressure resistance and the durability of the sealing device 6, and in particular of the oil lip 20.

A surface 14S on the liquid L side of the back-up ring 14 and a surface 18S on the liquid L side of the liquid-side elastic ring 18 are provided so as to be as flush as possible with respect to a surface 16S on the liquid L side of the annular portion 16a of the liquid-side rigid ring 16.

The back-up ring 14 is sandwiched between the atmosphere-side rigid ring 22 and the liquid-side elastic ring 18, and the atmosphere-side rigid ring 22 contacts the back-up ring 14 in a direction parallel to the axial direction of the reciprocating shaft 4, and thus in axial alignment with the reciprocating shaft 4, and reinforces, i.e., supports, the back-up ring 14.

FIG. 3 is an enlarged cross-sectional view of a portion of the sealing device 6 of FIG. 1. As shown in FIG. 3, in the inner peripheral surface 22A of the atmosphere-side rigid ring 22, there is a corner portion 22B on the back-up ring 14 side (liquid side), and a corner portion 22C on the atmosphere side opposite thereto. As described later, the corner portions 22B, 22C are rendered as inclined surfaces by a machining process. Specifically, the inclined surface of the corner portion 22B is created by burr-removal after the punching-out process, and the inclined surface of the corner portion 22C is a rollover created in the punching-out process. In this embodiment, both corner portions 22B, 22C are covered by the atmosphere-side elastic ring 24 of the dust seal member 12, but this feature is not essential.

In this embodiment, the maximum diameter Db (diameter of a portion where the inclined surface of the corner portion 22B intersects the upper flat surface of the atmosphere-side rigid ring 22 in FIG. 3) of the inclined surface of the corner portion 22B on the back-up ring 14 side in the inner peripheral surface 22A of the atmosphere-side rigid ring 22 is smaller than the diameter Da (outer diameter of the surface 14S of the back-up ring 14) of the back-up ring 14 on the atmosphere-side rigid ring 22 side. Accordingly, at least one portion of (the surface 14S of) the back-up ring 14 definitely contacts the atmosphere-side rigid ring 22 and is reinforced by the atmosphere-side rigid ring 22. Accordingly, it is possible to enhance the pressure resistance and the durability of the sealing device 6.

FIG. 4 is an enlarged cross-sectional view of a portion of another suitable sealing device. In this example, too, the maximum diameter Db of the inclined surface of the corner portion 22B on the back-up ring 14 side in the inner peripheral surface 22A of the atmosphere-side rigid ring 22 is smaller than the diameter Da of the back-up ring 14 on the atmosphere-side rigid ring 22 side. Accordingly, at least one portion of (the surface 14S of) the back-up ring 14 definitely contacts the atmosphere-side rigid ring 22 and is reinforced by the atmosphere-side rigid ring 22. Accordingly, it is possible to enhance the pressure resistance and the durability of the sealing device.

Meanwhile, FIG. 5 is an enlarged cross-sectional view of a portion of a non-suitable sealing device. In this sealing device, the maximum diameter Db of the inclined surface of the corner portion 22B on the back-up ring 14 side in the inner peripheral surface 22A of the atmosphere-side rigid ring 22 is greater than the diameter Da of the back-up ring 14 on the atmosphere-side rigid ring 22 side. Accordingly, (the surface 14S of) the back-up ring 14 does not contact the atmosphere-side rigid ring 22 and the back-up ring 14 is not reinforced by the atmosphere-side rigid ring 22. Thus, there is a concern of the back-up ring 14 peeling from the liquid-side rigid ring 18 with the reciprocal movement of the reciprocating shaft 4.

As described above, it is preferable that Db<Da.

Advantages of the sealing devices of FIG. 3 and FIG. 4 shall be explained from a different perspective. In the sealing devices shown in FIGS. 3 and 4, the length Lb of the inclined surface of the corner portion 22B on the back-up ring 14 side in the inner peripheral surface 22A of the atmosphere-side rigid ring 22 is smaller than the length Lc of the inclined surface of the corner portion 22C on the opposite side in the inner peripheral surface 22A. Meanwhile, in the sealing device shown in FIG. 5, the length Lb of the inclined surface of the corner portion 22B on the back-up ring 14 side is greater than the length Lc of the inclined surface of the corner portion 22C on the opposite side.

In the sealing devices shown in FIG. 3 and FIG. 4, Lb<Lc and therefore the contact surface area of the back-up ring 14 with respect to the atmosphere-side rigid ring 22 is greater than when Lb>Lc (FIG. 5) and the back-up ring 14 is strongly reinforced by the atmosphere-side rigid ring 22. Accordingly, it is possible to enhance the pressure resistance and the durability of the sealing device. When durability testing was carried out under certain high pressure conditions, it was discovered that the sealing device in FIG. 3 has a lifetime approximately 1.5 times longer than that of the sealing device in FIG. 5.

Next, a method for manufacturing the sealing device 6 shall be described. First, a method for producing the atmosphere-side rigid ring 22 of the sealing device 6 shall be described with reference to FIGS. 6 to 8. As shown in FIG. 6, a circular plate 42, which is a material of the atmosphere-side rigid ring 22, is put on a die 40 having a through-hole 40A. Then, a through-hole 42A is formed in the circular plate 42 by performing a punching-out process using a cross-sectionally circular punch 44.

The inner peripheral surface of the through-hole 42A in the circular plate 42 corresponds to the inner peripheral surface 22A in FIG. 3 and FIG. 4. As shown in FIG. 7, during the punching-out process, a rollover 42C is created at the end portion of the through-hole 42A on the side of a surface 42B which is contacted by the end surface of the punch 44. Further, during the punching-out process, a burr 42E is created around the through-hole 42A on a side 42D opposite the surface 42B.

By performing burr-removal after the punching-out process, an inclined portion 42F shown in FIG. 8 is created. Thus, the atmosphere-side rigid ring 22 is completed.

In this atmosphere-side rigid ring 22, the maximum diameter of the rollover 42C is significantly greater than the maximum diameter of the inclined portion 42F. As is clear from the above description which refers to FIGS. 3 to 5, it is preferable that the atmosphere-side rigid ring 22 is provided relative to the back-up ring 14 with the inclined portion 42F being a corner portion 22B in the vicinity of the back-up ring 14, and the rollover 42C being a corner portion 22C away from the back-up ring 14.

To produce the oil seal member 10, an elastic member comprising the liquid-side elastic ring 18, the outer gasket 19, and the thin film portion 21 may, for example, be adhered to the liquid-side rigid ring 16 using an adhesive. To produce the dust seal member 12, the atmosphere-side elastic member 24 may, for example, be adhered to the atmosphere-side rigid ring 22 using an adhesive.

Steps of another production method for the oil seal member 10 and the dust seal member 12 are explained with reference to FIG. 9 and FIG. 10. For example, it is possible to mold the oil seal member 10 and the dust seal member 12 by using, respectively, molds 50 and 52. The mold 50 comprises an upper mold 50A and a lower mold 50B, and the mold 52 comprises an upper mold 52A and a lower mold 52B.

In this production method, the locations in the liquid-side rigid ring 16 to which the liquid-side elastic ring 18, the outer gasket 19, and the thin film portion 21 are to be bonded are coated with an adhesive, the location in the atmosphere-side rigid ring 22 to which the atmosphere-side elastic ring 24 is to be bonded is coated with the adhesive, and then the liquid-side rigid ring 16 and the atmosphere-side rigid ring 22 are arranged, respectively, in the molds 50, 52. In addition, an elastic material is arranged in the molds 50, 52, the molds 50, 52 are compressed, and the liquid-side elastic ring 18, the outer gasket 19, the thin film portion 21, and the atmosphere-side elastic ring 24 are molded, thereby completing the oil seal member 10 and the dust seal member 12. FIG. 9 shows a molding space 18h for molding the liquid-side elastic ring 18, a molding space 19h for molding the outer gasket 19, and a molding space 21h for molding the thin film portion 21. FIG. 10 shows a molding space 24h for molding the atmosphere-side elastic ring 24.

As shown in FIG. 10, in the production of the dust seal member 12, a rollover 42C is provided in the vicinity of the molding space 24h for molding the atmosphere-side elastic ring 24 and the inclined portion 42F is provided on the opposite side thereto. Due to the foregoing, in the dust seal member 12 that is formed as a result, a corner portion 22C having a large inclined portion is arranged in the vicinity of the atmosphere-side elastic ring 24, and on the opposite side thereto, a corner portion 22B having a small inclined portion is arranged.

Next, as shown in FIG. 11, the back-up ring 14 is fitted in the concave portion 18A of the liquid-side elastic ring 18 of the oil seal member 10. Thus, the back-up ring 14 is caused to contact the liquid-side elastic ring 18 in a direction parallel to the axial direction of the reciprocating shaft 4.

Moreover, as shown in FIG. 12, the dust seal member 12 and the oil seal member 10 are combined so that the atmosphere-side rigid ring 22 of the dust seal member 12 contacts the annular portion 16a and the cylindrical portion 16b of the liquid-side rigid ring 16 of the oil seal member 10. As a result thereof, the atmosphere-side rigid ring 22 is caused to contact the back-up ring 14 in a direction parallel to the axial direction of the reciprocating shaft 4 so that the surface 42B contacted by the end surface of the punch 44 during the punching-out process of the atmosphere-side rigid ring 22 is positioned on the opposite side to the back-up ring 14. That is, the corner portion 22B which has the inclined surface with a smaller length is positioned in the vicinity of the back-up ring 14, and the corner portion 22C which has the inclined surface with a larger length is positioned on the opposite side to the back-up ring 14.

According to this method, by causing the atmosphere-side rigid ring 22 to contact the back-up ring 14 in a direction parallel to the axial direction of the reciprocating shaft 4 so that the surface 42B contacted by the end surface of the punch 44 during the punching-out process of the atmosphere side rigid ring 22 is positioned on the opposite side to the back-up ring 14, it is possible to realize a configuration wherein the length Lb of the inclined surface of the corner portion 22B on the back-up ring 14 side in the inner peripheral surface 22A of the atmosphere-side rigid ring 22 is smaller than the length Lc of the inclined surface of the corner portion 22C on the opposite side to the back-up ring 14 in the inner peripheral surface 22A of the atmosphere-side rigid ring 22.

Second Embodiment

FIG. 13 shows a sealing device 61 according to the second embodiment of the present invention. Figures from FIG. 13 onwards show constituent elements which are in common with the first embodiment, and therefore the same reference signs are used and no detailed description is provided regarding these constituent elements.

This sealing device 61 comprises four separate members, i.e., an oil seal member 10, a dust seal member 62, an intermediate rigid ring (atmosphere-side rigid ring) 66, and a back-up ring (reinforcement ring) 14.

The dust seal member 62 comprises: a rigid ring 64 provided inside the shaft hole 2A and attached to the shaft hole 2A; and an atmosphere-side elastic ring 24 fixed to the rigid ring 64. The rigid ring 64 is formed from a rigid body such as a metal. The liquid-side rigid ring 64 has an L-shaped cross-section and comprises an annular portion 64a and a cylindrical portion 64b extending from an outer edge of the annular portion 64a. The rigid ring 64 is further to the atmosphere side than are the liquid-side rigid ring 16 and the intermediate rigid ring 66 of the oil seal member 10 and therefore it is possible to refer to the rigid ring 64 as an atmosphere-side rigid ring. However, in the specification, the intermediate rigid ring 66 is regarded as being the atmosphere-side rigid ring and the rigid ring 64 is regarded as being an additional rigid ring.

The atmosphere-side elastic ring 24 is formed from an elastic material such as an elastomer and is fixed to the inner peripheral edge of the annular portion 64a of the rigid ring 64. The atmosphere-side elastic ring 24 has formed thereon a dust lip 26 provided radially inward of the rigid ring 64. The dust lip 26 contacts the outer peripheral surface of the reciprocating shaft 4 and predominantly fulfills a role of preventing foreign matter (for example, mud, water, dust) from entering from the atmosphere A side to the liquid L side. When the reciprocating shaft 4 moves in the direction of the central axis C, the reciprocating shaft 4 slides with respect to the dust lip 26. The dust lip 26 may make sealing contact with the outer peripheral surface of the reciprocating shaft 4 so as to fulfill a role of preventing or reducing leakage of a liquid. A garter spring (not shown) for pressing the dust lip 26 to the reciprocating shaft 4 may be wound around the atmosphere-side elastic ring 24.

The intermediate rigid ring 66 is a thick circular ring formed from a rigid body such as a metal and is sandwiched and fixed between the liquid-side rigid ring 16 of the oil seal member 10 and the rigid ring 64 of the dust seal member 62.

In the same manner as in the first embodiment, the back-up ring 14 is detachably fitted in the concave portion 18A of the liquid-side elastic ring 18 of the oil seal member 10. The back-up ring 14 is sandwiched between the intermediate rigid ring 66 and the liquid-side elastic ring 18, and the intermediate rigid ring 66 contacts the back-up ring 14 in a direction parallel to the axial direction of the reciprocating shaft 4, and reinforces, i.e., supports, the back-up ring 14.

On the inner peripheral surface 66A of the rigid ring 66, there is a corner portion 66B on the back-up ring 14 side (liquid side), and a corner portion 66C on the atmosphere side opposite thereto. The inclined surface of the corner portion 66B is created by burr-removal after the punching-out process, and the inclined surface of the corner portion 66C is a rollover created in the punching-out process.

For the same reason as in the first embodiment, in this embodiment, too, the maximum diameter Db (diameter of a portion where the inclined surface of the corner portion 66B intersects the upper flat surface of the rigid ring 66 in FIG. 13) of the inclined surface of the corner portion 66B on the back-up ring 14 side in the inner peripheral surface 66A of the rigid ring 66 is smaller than the diameter Da of the back-up ring 14 on the rigid ring 66 side. Accordingly, at least one portion of the back-up ring 14 definitely contacts the rigid ring 66 and is reinforced by the rigid ring 66. Accordingly, it is possible to enhance the pressure resistance and the durability of the sealing device 61.

From a different perspective, the length Lb of the inclined surface of the corner portion 66B on the back-up ring 14 side in the inner peripheral surface 66A of the rigid ring 66 is smaller than the length Lc of the inclined surface of the corner portion 66C on the opposite side in the inner peripheral surface 66A. Lb<Lc and therefore the contact surface area of the back-up ring 14 with respect to the rigid ring 66 is larger than when Lb>Lc, and the back-up ring 14 is strongly reinforced by the rigid ring 66. Accordingly, it is possible to enhance the pressure resistance and the durability of the sealing device 61.

To manufacture this sealing device 61, it is first necessary to prepare the oil seal member 10, the dust seal member 62, the intermediate rigid ring 66, and the back-up ring 14. The method for producing the intermediate rigid ring 66 may be the same as the method for producing the atmosphere-side rigid ring 22 of the sealing device 6 of the first embodiment described above with reference to FIGS. 6 to 8. In assembling the sealing device 61, it is preferable that the intermediate rigid ring 66 is provided relative to the back-up ring 14, with the inclined portion 42F being the corner portion 66B in the vicinity of the back-up ring 14, and the rollover 42C being the corner portion 66C remote from the back-up ring 14.

To produce the oil seal member 10, an elastic member comprising the liquid-side elastic member 18, the outer gasket 19, and the thin film portion 21 may, for example, be adhered to the liquid-side rigid ring 16 using an adhesive. Or, as described above with reference to FIG. 9, the oil seal member 10 can be formed by using the mold 50.

To produce the dust seal member 62, the atmosphere-side elastic ring 24 may, for example, be adhered to the rigid ring 64 using an adhesive. Or, in the same manner as in the production of the dust seal member 12 described above with reference to FIG. 10, the dust seal member 62 can be formed by using a mold.

Next, in the same manner as in the first embodiment shown in FIG. 11, the back-up ring 14 is fitted in the concave portion 18A of the liquid-side elastic ring 18 of the oil seal member 10. Thus, the back-up ring 14 is caused to contact the liquid-side elastic ring 18 in a direction parallel to the axial direction of the reciprocating shaft 4.

Moreover, as shown in FIG. 13, the oil seal member 10, the back-up ring 14, the intermediate rigid ring 66, and the dust seal member 62 are combined so that the intermediate rigid ring 66 contacts the annular portion 16a and the cylindrical portion 16b of the liquid-side rigid ring 16 of the oil seal member 10, and also contacts the annular portion 64a and the cylindrical portion 64b of the rigid ring 64 of the dust seal member 62. At that time, the atmosphere-side rigid ring 64 is caused to contact the back-up ring 14 in a direction parallel to the axial direction of the reciprocating shaft 4 so that the surface 42B contacted by the end surface of the punch 44 during the punching-out process of the intermediate rigid ring 66 is positioned on the opposite side to the back-up ring 14. That is, the corner portion 66B which has the inclined surface with a smaller length Lb is positioned in the vicinity of the back-up ring 14, and the corner portion 66C which has the inclined surface with a larger length Lc is positioned on the opposite side to the back-up ring 14.

According to this method, by causing the intermediate rigid ring 66 to contact the back-up ring 14 in a direction parallel to the axial direction of the reciprocating shaft 4 so that the surface 42B contacted by the end surface of a punch 44 during the punching-out process of the intermediate rigid ring 66 is positioned on the opposite side to the back-up ring 14, it is possible to realize a configuration wherein the length Lb of the inclined surface of the corner portion 66B on the back-up ring 14 side in the inner peripheral surface 66A of the intermediate rigid ring 66 is smaller than the length Lc of the inclined surface of the corner portion 66C on the opposite side to the back-up ring 14 in the inner peripheral surface 66A of the intermediate rigid ring 66.

Third Embodiment

FIG. 14 shows a sealing device 71 according to the third embodiment of the present invention. The sealing device 71 is used in a hydraulic power steering device 72. The power steering device 72 comprises a cylindrical housing (cylinder tube) 2 and a columnar reciprocating shaft (rod) 4. The reciprocating shaft 4 is coupled to or integrated with a rack (not shown) which applies an auxiliary rotary force on a steering shaft. Oil, that is, a liquid L, has been put into the shaft hole 2A of the housing 2.

The sealing device 71, which is an oil seal, and a support cylinder 73 are fixed inside the shaft hole 2A by being press-fitted therein. The support cylinder 73 restricts movement of the sealing device 71 along the axial direction of the reciprocating shaft 4. The sealing device 71 comprises two separate members, i.e., an oil seal member 80 and a back-up ring (reinforcement ring) 82.

The oil seal member 80 comprises: a rigid ring 84 provided inside the shaft hole 2A and attached to the shaft hole 2A; and an elastic ring 86 fixed to the rigid ring 84. The rigid ring 84 is formed from a rigid body such as a metal. The rigid ring 84 has an L-shaped cross-section and comprises an annular atmosphere-side rigid ring 84a and a cylindrical liquid-side rigid ring 84b extending from an outer edge of the atmosphere-side rigid ring 84a. In this embodiment, the atmosphere-side rigid ring 84a and the liquid-side rigid ring 84b are formed integrally.

The elastic ring 86 is formed from an elastic material such as an elastomer and the liquid-side rigid ring 84b of the rigid ring 84 is embedded therein. In other words, the rigid ring 84 and the elastic ring 86 constitute one oil seal member 80. The elastic ring 86 is provided concentric with the rigid ring 84 and due thereto, the elastic ring 86 comprises an outer portion 86A outside of the liquid-side rigid ring 84b, and an inner portion 86b inside of the liquid-side rigid ring 84b.

The liquid-side rigid ring 84b of the rigid ring 84 applies a supporting force on the outer portion 86A of the elastic ring 86 radially outwardly, that is, toward the inner peripheral surface of the shaft hole 2A, and the outer portion 86A is compressed by the inner peripheral surface of the shaft hole 2A and the outer portion 86A. Thus, the outer portion 86A prevents or reduces leakage of a liquid through an outer portion of the shaft hole 2A from the liquid L side to the atmosphere A side. The outer portion 86A and the inner portion 86B may be separate, but in this embodiment, are coupled and constitute one elastic ring 86.

The inner portion 86B of the elastic ring 86 has formed thereon an oil lip (seal lip) 88 that is provided radially inward of the liquid-side rigid ring 84b and slidably makes sealing contact with the reciprocating shaft 4. The oil lip 88 makes sealing contact with the outer peripheral surface of the reciprocating shaft 4 and prevents or reduces leakage of a liquid from the liquid L side to the atmosphere A side. When the reciprocating shaft 4 moves in the direction of the central axis C, the reciprocating shaft 4 slides with respect to the oil lip 88.

This sealing device 71 comprises a garter spring 90 wound around the oil lip 88 of the elastic ring 86. The garter spring 90 applies a force on the oil lip 88 for pressing the oil lip 88 to the reciprocating shaft 4. However, the garter ring 90 is not essential.

A concave portion 86C is formed radially inward of the inner portion 86B of the elastic ring 86. The concave portion 86C has detachably fitted therein a back-up ring 82 formed from a rigid body such as a resin (for example, polytetrafluoroethylene) or a metal. A through-hole in which the reciprocating shaft 4 is to be inserted is formed in the center of the back-up ring 82. The back-up ring 82 is fitted in the concave portion 86C and therefore contacts the elastic ring 86 in a direction parallel to the axial direction of the reciprocating shaft 4 and reinforces the elastic ring 86. Due to the back-up ring 82, it is possible to enhance the pressure resistance and the durability of the sealing device 71, and in particular of the oil lip 88.

The back-up ring 82 is sandwiched between the atmosphere-side rigid ring 84a of the rigid ring 84 and the oil lip 88 of the elastic ring 86, and the atmosphere-side rigid ring 84a contacts the back-up ring 82 in a direction parallel to the axial direction of the reciprocating shaft 4, and reinforces, i.e., supports, the back-up ring 82.

On the inner peripheral surface of the atmosphere-side rigid ring 84a, there is a corner portion 92B on the back-up ring 82 side (liquid side), and a corner portion 92C on the atmosphere side opposite thereto. The inclined surface of the corner portion 92B is created by burr-removal after the punching-out process, and the inclined surface of the corner portion 92C is a rollover created in the punching-out process.

In this embodiment, too, the maximum diameter Db (diameter of a portion where the inclined surface of the corner portion 92B intersects a flat surface of the atmosphere-side rigid ring 84a in the right of FIG. 14) of the inclined surface of the corner portion 92B on the back-up ring 82 side in the inner peripheral surface of the atmosphere-side rigid ring 84a is smaller than the diameter Da of the back-up ring 82 on the atmosphere-side rigid ring 84a side. Accordingly, at least one portion of the back-up ring 82 definitely contacts the atmosphere-side rigid ring 84a and is reinforced by the atmosphere-side rigid ring 84a. Accordingly, it is possible to enhance the pressure resistance and the durability of the sealing device 71.

From a different perspective, the length of the inclined surface of the corner portion 92B on the back-up ring 82 side in the inner peripheral surface of the atmosphere-side rigid ring 84a is smaller than the length of the inclined surface of the corner portion 92C on the opposite side in the inner peripheral surface 92A. Due thereto, the contact surface area of the back-up ring 82 with respect to the atmosphere-side rigid ring 84a is larger and the back-up ring 82 is more strongly reinforced by the atmosphere-side rigid ring 84a than if the relative sizes of the lengths were reversed. Accordingly, it is possible to enhance the pressure resistance and the durability of the sealing device 71.

To manufacture the sealing device 71, it is first necessary to prepare the oil seal member 80 and the back-up ring 82. The rigid ring 84 of the oil seal member 80 can be produced by a punching-out process. In the step of the punching-out process, which is not shown, the surface 84c of the atmosphere-side rigid ring 84a of the rigid ring 84 is a surface contacted by the end surface of the punch during the punching-out process. To produce the oil seal member 80, preferably a mold (not shown) is used and the elastic ring 86 can be fixed to the rigid ring 84.

Next, the back-up ring 82 is moved in a direction from the oil lip 88 toward the atmosphere-side rigid ring 84a and fitted into the concave portion 86C of the elastic ring 86 of the oil seal member 80. The inner diameter of the oil lip 88 is smaller than the outer diameter of the concave portion 86C, but by causing the oil lip 88 to deform, the back-up ring 82 can pass through the oil lip 88. Thus, the back-up ring 82 is caused to contact the elastic ring 86 in a direction parallel to the axial direction of the reciprocating shaft 4. Simultaneously therewith, the atmosphere-side rigid ring 84a can be caused to contact the back-up ring 82 in a direction parallel to the axial direction of the reciprocating shaft 4 so that the surface 84c contacted by the end surface of the punch during the punching-out process of the elastic ring 86 is positioned on the opposite side to the back-up ring 82. That is, the corner portion 92B which has an inclined surface with a smaller length is positioned in the vicinity of the back-up ring 82, and the corner portion 92C which has an inclined portion with a larger length is positioned on the opposite side to the back-up ring 82.

According to this method, by causing the atmosphere-side rigid ring 84a to contact the back-up ring 82 in a direction parallel to the axial direction of the reciprocating shaft 4 so that the surface 84c contacted by the end surface of the punch 44 during the punching-out process of the elastic ring 86 is positioned on the opposite side to the back-up ring 82, it is possible to realize a configuration wherein the length of the inclined surface of the corner portion 92B on the back-up ring 82 side in the inner peripheral surface of the atmosphere-side rigid ring 84a is smaller than the length of the inclined surface of the corner portion 92C on the opposite side to the back-up ring 82 in the inner peripheral surface of the atmosphere-side rigid ring 84a.

Fourth Embodiment

FIG. 15 shows a sealing device 101 according to the fourth embodiment of the present invention. The sealing device 101 is also used in a hydraulic power steering device 102. The power steering device 102 comprises a cylindrical housing (cylinder tube) 2 and a columnar reciprocating shaft (rod) 4. The reciprocating shaft 4 is coupled to or integrated with a rack (not shown) which applies an auxiliary rotary force on a steering shaft. Oil, that is, a liquid L, has been put into the shaft hole 2A of the housing 2.

The sealing device 101, which is an oil seal, is fixed inside the shaft hole 2A by being press-fitted therein. Further, a stopper 103 for restricting movement of the sealing device 101 along the axial direction of the reciprocating shaft 4 is fixed inside the housing 2. The sealing device 101 comprises three separate members, i.e., an oil seal member 110, an atmosphere-side rigid ring 111, and a back-up ring (reinforcement ring) 112.

The oil seal member 110 is similar to the oil seal member 80 of the third embodiment and comprises: a rigid ring 114 provided inside the shaft hole 2A and attached to the shaft hole 2A; and an elastic ring 116 fixed to the rigid ring 114. The rigid ring 114 is formed from a rigid body such as a metal. The rigid ring 114 has an L-shaped cross-section and comprises an annular portion 114a and a cylindrical portion 114b extending from an outer edge of the annular portion 114a. In this embodiment, the annular portion 114a and the cylindrical portion 114b are formed integrally.

The elastic ring 116 is formed from an elastic material such as an elastomer, and the cylindrical portion 114b of the rigid ring 114 is embedded therein. In other words, the rigid ring 114 and the elastic ring 116 constitute one oil seal member 110. The elastic ring 116 is provided concentric with the rigid ring 114 and due thereto, the elastic ring 116 comprises an outer portion 116A outside of the cylindrical portion 114b, and an inner portion 116b inside of the cylindrical portion 114b.

The cylindrical portion 114b of the rigid ring 114 applies a supporting force on the outer portion 116A of the elastic ring 116 radially outwardly, that is, toward the inner peripheral surface of the shaft hole 2A, and the outer portion 116A is compressed by the inner peripheral surface of the shaft hole 2A and the outer portion 116A. Thus, the outer portion 116A prevents or reduces leakage of a liquid through an outer portion of the shaft hole 2A from the liquid L side to the atmosphere A side. The outer portion 116A and the inner portion 116B may be separate, but in this embodiment, are coupled and constitute one elastic ring 116.

The inner portion 116B of the elastic ring 116 has formed thereon an oil lip (seal lip) 118 that is provided radially inward of the cylindrical portion 114b and that slidably makes sealing contact with the reciprocating shaft 4. The oil lip 118 makes sealing contact with the outer peripheral surface of the reciprocating shaft 4 and prevents or reduces leakage of a liquid from the liquid L side to the atmosphere A side. When the reciprocating shaft 4 moves in the direction of the central axis C, the reciprocating shaft 4 slides with respect to the oil lip 118.

The sealing device 101 comprises a garter spring 90 wound around the oil lip 118 of the elastic ring 116. The garter spring 90 applies a force on the oil lip 118 for pressing the oil lip 118 to the reciprocating shaft 4. However, the garter ring 90 is not essential.

A concave portion 116C is formed radially inward of the oil seal member 10. The concave portion 116C has detachably fitted therein a back-up ring 112 formed from a rigid body such as a resin (for example, polytetrafluoroethylene) or a metal. A through-hole into which the reciprocating shaft 4 is to be inserted is formed in the center the back-up ring 112. The back-up ring 112 is fitted in the concave portion 116C and therefore contacts the elastic ring 116 in a direction parallel to the axial direction of the reciprocating shaft 4 and reinforces the elastic ring 116. Due to the back-up ring 112, it is possible to enhance the pressure resistance and the durability of the sealing device 101, and in particular of the oil lip 118.

An atmosphere-side rigid ring 111 is a thick circular ring formed from a rigid body such as a metal, is inserted inside the shaft hole 2A, and movement thereof in the axial direction is restricted by a stopper (snap-ring) 103.

The back-up ring 112 is sandwiched between the atmosphere-side rigid ring 111 and the oil lip 118 of the elastic ring 116, and the atmosphere-side rigid ring 111 contacts the back-up ring 112 in a direction parallel to the axial direction of the reciprocating shaft 4, and reinforces, i.e., supports, the back-up ring 112.

In the inner peripheral surface of the atmosphere-side rigid ring 111, there is a corner portion 111B on the back-up ring 112 side (liquid side), and a corner portion 111C on the atmosphere side opposite thereto. The inclined surface of the corner portion 111B is created by burr-removal after the punching-out process, and the inclined surface of the corner portion 111C is a rollover created in the punching-out process.

In this embodiment, too, the maximum diameter Db (diameter of a portion where the inclined surface of the corner portion 111B intersects a flat surface of the atmosphere-side rigid ring 111 in the right of FIG. 15) of the inclined surface of the corner portion 111B on the back-up ring 112 side in the inner peripheral surface of the atmosphere-side rigid ring 111 is smaller than the diameter Da of the back-up ring 112 on the atmosphere-side rigid ring 111 side. Accordingly, at least one portion of the back-up ring 112 definitely contacts the atmosphere-side rigid ring 111 and is reinforced by the atmosphere-side rigid ring 111. Accordingly, it is possible to enhance the pressure resistance and the durability of the sealing device 101.

From a different perspective, the length of the inclined surface of the corner portion 111B on the back-up ring 112 side in the inner peripheral surface of the atmosphere-side rigid ring 111 is smaller than the length of the inclined surface of the corner portion 111C on the opposite side in the inner peripheral surface 111A. Due thereto, the contact surface area of the back-up ring 112 with respect to the atmosphere-side rigid ring 111 is larger and the back-up ring 112 is more strongly reinforced by the atmosphere-side rigid ring 111 than if the relative sizes of the lengths were reversed. Accordingly, it is possible to enhance the pressure resistance and the durability of the sealing device 101.

To manufacture the sealing device 101, firstly it is necessary to prepare the oil seal member 110, the atmosphere-side rigid ring 111, and the back-up ring 112. The oil seal member 110 can be produced by a punching-out process. In the step of the punching-out process, which is not shown, the surface 111a of the atmosphere-side rigid ring 111 is a surface contacted by the end surface of the punch during the punching-out process. To produce the oil seal member 110, preferably a mold (not shown) is used and the elastic ring 116 can be fixed to the rigid ring 114.

Next, the back-up ring 112 is fitted in the concave portion 116C of the elastic ring 116 of the oil seal member 110. Thus, the back-up ring 112 is caused to contact the elastic ring 116 in a direction parallel to the axial direction of the reciprocating shaft 4.

Moreover, the atmosphere-side rigid ring 111 is caused to contact the back-up ring 112 in a direction parallel to the axial direction of the reciprocating shaft 4 so that the surface 111a contacted by the end surface of the punch during the punching-out process of the elastic ring 116 is positioned on the opposite side to the back-up ring 112. That is, the corner portion 111B which has an inclined surface with a smaller length is positioned in the vicinity of the back-up ring 112, and the corner portion 111C which has an inclined portion with a larger length is positioned on the opposite side to the back-up ring 112.

According to this method, by causing the atmosphere-side rigid ring 111 ring to contact the back-up ring 112 in a direction parallel to the axial direction of the reciprocating shaft 4 so that the surface 111a contacted by the end surface of the punch during the punching-out process of the elastic ring 116 is positioned on the opposite side to the back-up ring 112, it is possible to realize a configuration wherein the length of the inclined surface of the corner portion 111B on the back-up ring 112 side in the inner peripheral surface of the atmosphere-side rigid ring 111 is smaller than the length of the inclined surface of the corner portion 111C on the opposite side to the back-up ring 112 in the inner peripheral surface of the atmosphere-side rigid ring 111.

Various embodiments of the present invention have been described above, but the above descriptions do not limit the present invention and, in the technical scope of the present invention, various modifications can be considered, including deletion, addition, and exchange of constituent elements.

For example, the abovementioned embodiments are a sealing device for a shock absorber or a power steering device, but uses of the sealing device are not limited thereto. Further, the abovementioned embodiments are used to seal a reciprocating shaft, but the present invention may also be used to seal a rotary shaft.

REFERENCE SIGNS LIST

1 Shock absorber
2 Housing
4 Reciprocating shaft
2A Shaft hole
6, 61, 71, 101 Sealing device
10, 80, 110 Oil seal member
12, 62 Dust seal member
14, 82, 112 Back-up ring (reinforcement ring)
16 Liquid-side rigid ring
18 Liquid-side elastic ring
20, 88, 118 Oil lip (seal lip)
22 Atmosphere-side rigid ring
24 Atmosphere-side elastic ring
26 Dust lip
22B, 22C, 66B, 66C, 92B, 92C, 111B, 111C Corner portion
22C Corner portion
40 Die
44 Punch
42C Rollover
42E Burr
42F Inclined portion
66 Intermediate rigid ring (atmosphere-side rigid ring)
72, 102 Power steering device
84 Rigid ring
86 Elastic ring
84a Atmosphere-side rigid ring
84b Liquid-side rigid ring
111 Atmosphere-side rigid ring
114 Rigid ring
116 Elastic ring

The invention claimed is:
1. A sealing device to be provided between a shaft and an inner surface of a shaft hole in which the shaft is provided, the sealing device, the shaft, and the shaft hole sharing a common central axis upon assembly, the sealing device comprising:
- a liquid-side rigid ring made of a rigid body and provided inside the shaft hole,
- an elastic ring which is made of an elastic body, is attached to the liquid-side rigid ring, is provided radially inward of the liquid-side rigid ring, and has formed thereon a seal lip that slidably makes sealing contact with the shaft,
- a reinforcement ring which contacts the elastic ring in axial alignment with the shaft and reinforces the elastic ring, and
- an atmosphere-side rigid ring which is made of a rigid body, contacts the reinforcement ring in axial alignment with the shaft, and reinforces the reinforcement ring, wherein:
- the atmosphere-side rigid ring has an inner radial peripheral surface having a corner portion that contacts the reinforcement ring and has an inclined surface that extends radially outward toward the reinforcement ring; and
- the inclined surface of the corner portion of the atmosphere-side rigid ring has a maximum diameter that is smaller than an outer diameter of the reinforcement ring that contacts the atmosphere-side rigid ring.

2. The sealing device according to claim 1, wherein the liquid-side rigid ring and the elastic ring are joined to one another and constitute one oil seal member.

3. The sealing device according to claim 1, wherein the liquid-side rigid ring and the atmosphere-side rigid ring are formed integrally, are further joined to the elastic ring, and constitute one oil seal member.

4. A method for manufacturing the sealing device of claim 1, the method comprising:
- a step for forming the atmosphere-side rigid ring by forming a through-hole in the rigid body from which the atmosphere-side rigid ring is made by a punching-out process,
- a step for causing the reinforcement ring for reinforcing the elastic ring to contact the elastic ring in axial alignment with the shaft, and
- a step for causing the atmosphere-side rigid ring to contact the reinforcement ring in axial alignment with the shaft so that a surface contacted by an end surface of a punch during the punching-out process of the atmosphere-side rigid ring is positioned on an opposite side to the reinforcement ring.

5. A sealing device to be provided between a shaft and an inner surface of a shaft hole in which the shaft is provided, the sealing device, the shaft, and the shaft hole sharing a common central axis upon assembly, the sealing device comprising:
- a liquid-side rigid ring made of a rigid body and provided in the shaft hole,
- an elastic ring which is made of an elastic body, is attached to the liquid-side rigid ring, is disposed radially inward of the liquid-side rigid ring, and has formed thereon a seal lip that slidably makes sealing contact with the shaft,
- a reinforcement ring which contacts the elastic ring in axial alignment with the shaft and reinforces the elastic ring, and
- an atmosphere-side rigid ring which is made of a rigid body, contacts the reinforcement ring in axial alignment with the shaft, and reinforces the reinforcement ring, wherein:
- the atmosphere-side rigid ring has an inner radial peripheral surface having (i) a first corner portion that contacts the reinforcement ring and has an inclined surface that extends radially outward toward the reinforcement ring; and (ii) a second corner portion on an opposite side to the first corner portion and has an inclined surface that extends radially outward away from the reinforcement ring; and
- the inclined surface of the first corner portion has a length that is smaller than a length of the inclined surface of the second corner portion of the atmosphere-side rigid ring.

6. The sealing device according to claim 5, wherein the liquid-side rigid ring and the elastic ring are joined to one another and constitute one oil seal member.

7. The sealing device according to claim 5, wherein the liquid-side rigid ring and the atmosphere-side rigid ring are formed integrally, are further joined to the elastic ring, and constitute one oil seal member.

8. A method for manufacturing the sealing device of claim 5, the method comprising:
- a step for forming the atmosphere-side rigid ring by forming a through-hole in the rigid body from which the atmosphere-side rigid ring is made by a punching-out process,
- a step for causing the reinforcement ring for reinforcing the elastic ring to contact the elastic ring in axial alignment with the shaft, and
- a step for causing the atmosphere-side rigid ring to contact the reinforcement ring in axial alignment with the shaft so that a surface contacted by an end surface of a punch during the punching-out process of the atmosphere-side rigid ring is positioned on an opposite side to the reinforcement ring.

* * * * *